Figure 1:
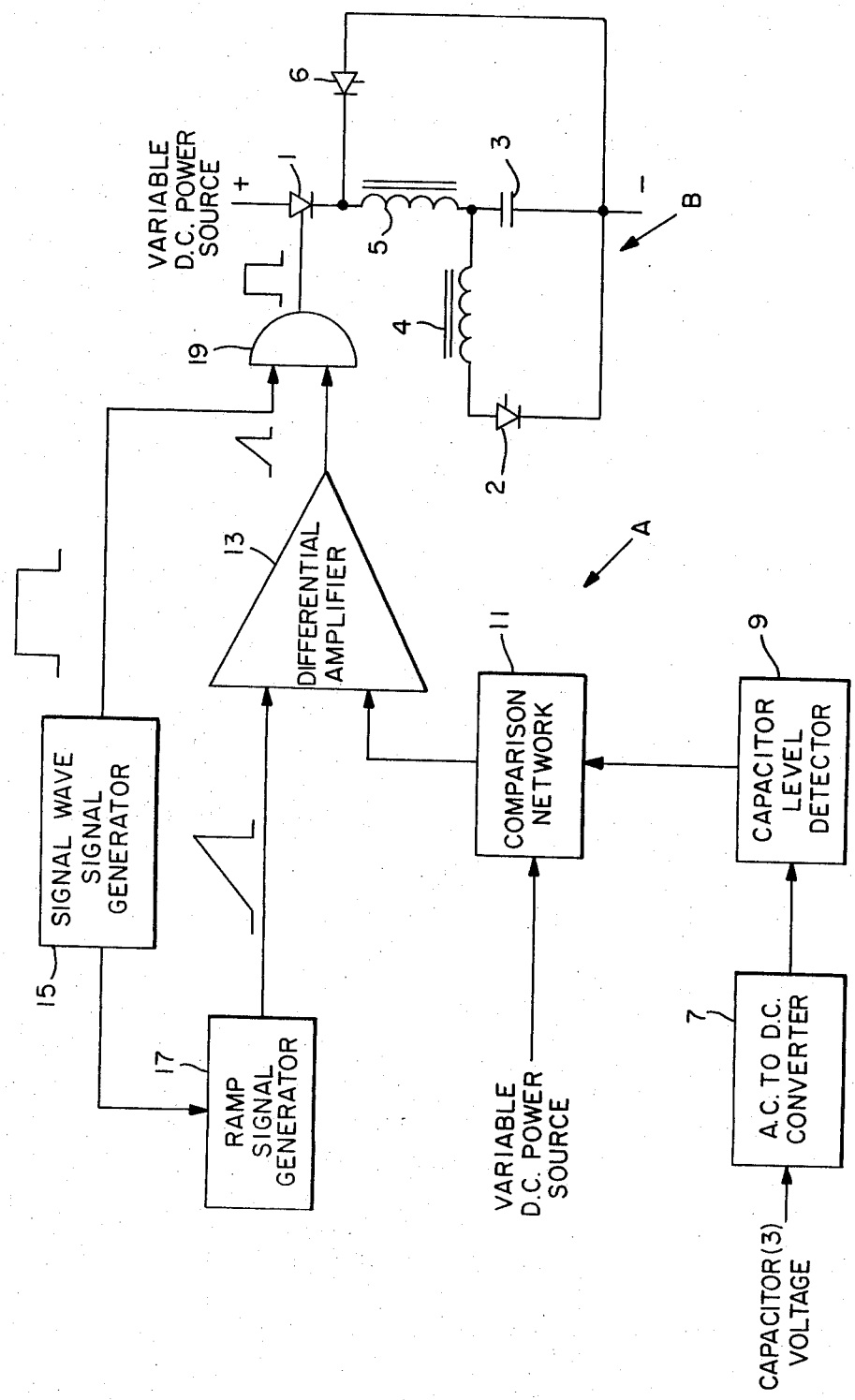

United States Patent [19]
Kautz et al.

[11] 3,859,582
[45] Jan. 7, 1975

[54] CIRCUIT FOR CONTROLLING THE CHARGE ON A CAPACITOR FROM A VARIABLE VOLTAGE SOURCE

[75] Inventors: Robert F. Kautz, Spring Lake; Leo B. Bourgeault, Wall Township; Raymond G. Lane, Manasquan, all of N.J.

[73] Assignee: The Bendix Corporation, Teterboro, N.J.

[22] Filed: Sept. 17, 1973

[21] Appl. No.: 397,510

[52] U.S. Cl. .................... 320/1, 323/19, 323/22 R
[51] Int. Cl. ......... G05f 1/44, G05f 1/46, G05f 5/00
[58] Field of Search .......... 320/1; 323/22 R, 16, 19

[56] References Cited
UNITED STATES PATENTS

| | | |
|---|---|---|
| 3,389,322 | 6/1968 | Smeltzer .............................. 320/1 |
| 3,486,038 | 12/1969 | Skamfer et al...................... 307/133 |
| 3,633,094 | 1/1972 | Clements ............................ 323/19 |
| 3,670,234 | 6/1972 | Joyce ................................... 321/18 |

*Primary Examiner*—Stuart N. Hecker
*Attorney, Agent, or Firm*—S. H. Hartz; Anthony F. Cuoco

[57] ABSTRACT

A circuit for providing gate logic signals for turning a silicon controlled rectifier on for a period of time required to charge a capacitor to a predetermined voltage level from a variable direct current power source even though the capacitor may retain a portion of its charge from the previous charge-discharge cycle.

4 Claims, 2 Drawing Figures

CIRCUIT FOR CONTROLLING THE CHARGE ON A CAPACITOR FROM A VARIABLE VOLTAGE SOURCE

The invention relates to charging a capacitor in an inductance-capacitance resonant circuit to a predetermined voltage from a variable voltage source.

In bridge inverters using silicon controlled rectifiers for converting variable direct current power to alternating current power, as shown and described in U.S. application Ser. No. 205,538 filed Dec. 7, 1971, now U.S. Pat. No. 3,775,662, and assigned to the same assignee as the present application, after the gate signal is removed the silicon controlled rectifiers are commutated to an off or high impedance forward conducting state by a commutation circuit including a capacitor which is discharged through a diode in anti-parallel with the silicon controlled rectifier to back bias the silicon controlled rectifier. In some instances the capacitor may be charged from the variable direct current power source and for proper operation of the inverter, it is necessary that the capacitor in the commutating circuit always be charged to a predetermined voltage level even though the capacitor may retain a portion of its charge from the previous charge-discharge cycle.

The novel circuit shown and described herein provides for charging a capacitor in an l.c. resonant circuit to a predetermined voltage from a variable voltage source.

The invention relates to a circuit for providing gate logic signals for turning a silicon controlled rectifier on for a period of time required to charge a capacitor to a predetermined voltage level from a variable direct current power source even though the capacitor may retain a portion of its charge from the previous charge-discharge cycle, comprising: a square wave signal generator for generating square wave signals; a ramp signal generator connected to the square wave signal generator and generating ramp signals in timed relationship to the square wave signals, means for providing signals corresponding to the difference between the variable direct current power source and the capacitor voltage level, and means connected to the means for providing difference signals, to the ramp signal generator, and to the square wave signal generator and providing gate logic signals of a width to turn the silicon controlled rectifier on for the time necessary to charge the capacitor to a predetermined voltage level from the variable direct current power source.

The main object of the present invention is to provide a circuit for charging a capacitor in a resonant l.c. circuit to a predetermined voltage from a variable direct current power source even though the capacitor may retain a portion of its charge from the previous charge-discharge cycle.

These and other objects and advantages of the invention will appear more fully hereinafter from a consideration of the detailed description which follows, taken together with the accompanying drawings wherein one embodiment of the invention is illustrated by way of example. It is to be understood, however, that the drawings are for the purpose of illustration only and are not a definition of the limits of the invention, reference being had to the appended claims.

Figure 2:
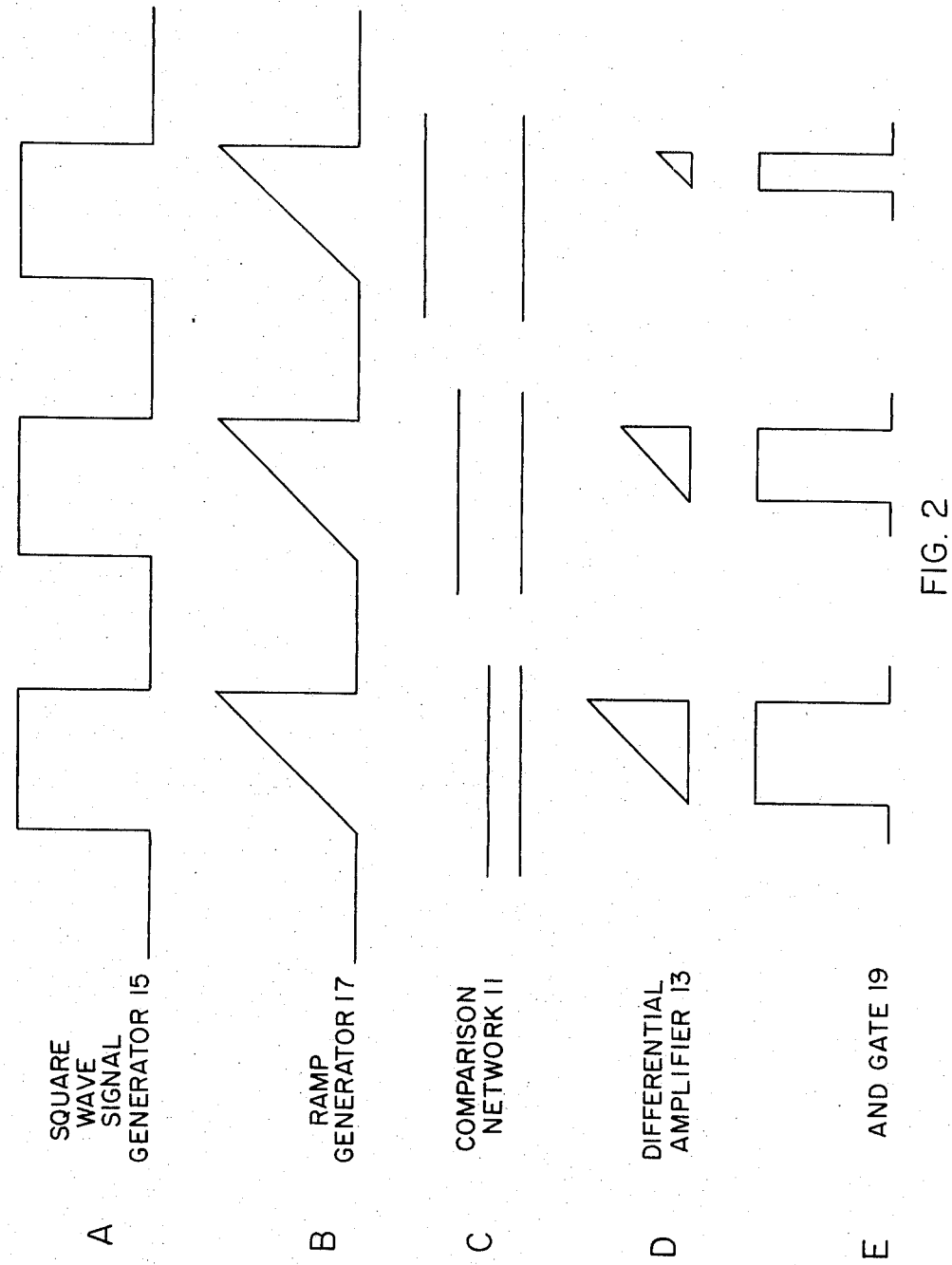

In the drawings,

FIG. 1 shows a circuit constructed according to the invention for generating gate logic signals to turn on a silicon controlled rectifier in an l.c. network and FIG. 2 shows the manner in which the gate logic signals are generated.

Referring to the drawings, FIG. 1 shows a novel circuit A for generating gate logic signals to turn on a silicon controlled rectifier 1 connected to a variable direct current source to charge a capacitor 3 in an l.c. network B to a predetermined voltage level. The silicon controlled rectifier 1 is turned on for a time determined by the amplitude of the variable direct current source and the charge on capacitor 3 from a previous charge-discharge cyle.

The l.c. network B includes capacitor 3 and an inductor 5 connected in series with silicon controlled rectifier 1 to the variable d.c. power source. Capacitor 3 may be discharged through an inductor 4 by turning on a silicon controlled rectifier 2 connected in series with inductor 4 and capacitor 3. The charge remaining on capacitor 3 after discharge may be reversed by turning on a silicon controlled rectifier 6 connected in series with inductor 5 and capacitor 3.

In circuit A for providing gate logic signals the remaining capacitor voltage is applied to an AC to DC converter 7 which has its output connected to a capacitor level detector 9.

A comparison network 11 is connected to the output of capacitor level detector 9 and to the variable direct current power source and provides at its output a voltage corresponding to the difference between the output of capacitor level detector 9 and the variable direct current power source. The capacitor voltage modifies the apparent D.C. level such that if the capacitor voltage is high the comparison network output is high and the delay time is long. Conversely, if the capacitor voltage is low the D.C. level is modified by the comparison network 11 to lower the D.C. level and shorten the time delay. The output of comparison network 11 is connected to one input of a differential amplifier 13.

A square wave signal generator 15 is connected to a ramp signal generator 17 and the ramp signal generator generates ramp signals in timed relationship to the square wave pulses. The ramp signals are applied to the second input of differential amplifier 13. An AND gate 19 is connected to the output of differential amplifier 13 and to square wave signal generator 15 and at its output provides logic signals of a width required to turn on silicon controlled rectifier 1 for a time required to charge capacitor 3 to a predetermined voltage level from the variable direct current power source.

In FIG. 2, A shows the square wave signals from signal generator 15, B shows the ramp signals from ramp generator 17, C shows several instantaneous levels of the output of comparison network 11 as determined by the variable direct current power source and the charge remaining on capacitor 3 from the previous charge-discharge cycle, D shows the output of differential amplifier 13, and E shows the resulting logic signals at the output of AND gate 19. The logic signals have a width corresponding to the instantaneous level of the variable direct current power source and the charge on capacitor 3. The logic signals turn on silicon controlled rectifier 1 for the time required to charge capacitor 3 to a predetermined voltage level irrespective of the amplitude of the variable direct current power source and the charge on capacitor 3.

What is claimed is:

1. A circuit for providing gate logic signals for turning a silicon controlled rectifier on for a period of time required to charge a capacitor in a resonant inductance capacitance circuit to a predetermined voltage level from a variable direct current power source even though the capacitor may retain a portion of its charge from the previous charge-discharge cycle, comprising: a square wave signal generator for generating square wave signals, a ramp signal generator connected to the square wave signal generator and generating ramp signals in timed relationship to the square wave signals, means for providing signals corresponding to the difference between the variable direct current power source and the capacitor voltage level, and means connected to the means for providing difference signals, to the ramp signal generator, and to the square wave signal generator and providing gate logic signals of a width to turn on the silicon controlled rectifier for the time necessary to charge the capacitor to a predetermined voltage level from the variable direct current power source.

2. A circuit as described in claim 1 in which the means for providing gate logic signals includes a differential amplifier having one of its inputs connected to the means for providing difference signals and the other input connected to the ramp signal generator, and an AND gate having one of its inputs connected to the square wave signal generator and the other input connected to the output of the differential amplifier and providing the gate logic signals.

3. A circuit as described in claim 2 in which the means for providing the difference signals includes a capacitor level detector and a comparison network for providing an output corresponding to the difference in the capacitor level and the variable power source.

4. A circuit as described in claim 1 in which the means for providing gate logic signals includes means for time phasing the logic signals during the recharge cycle in accordance with the charge on the capacitor and the level of the variable power source.

* * * * *